Nov. 2, 1937.  W. A. RAY  2,098,195
SOLENOID
Filed July 27, 1936
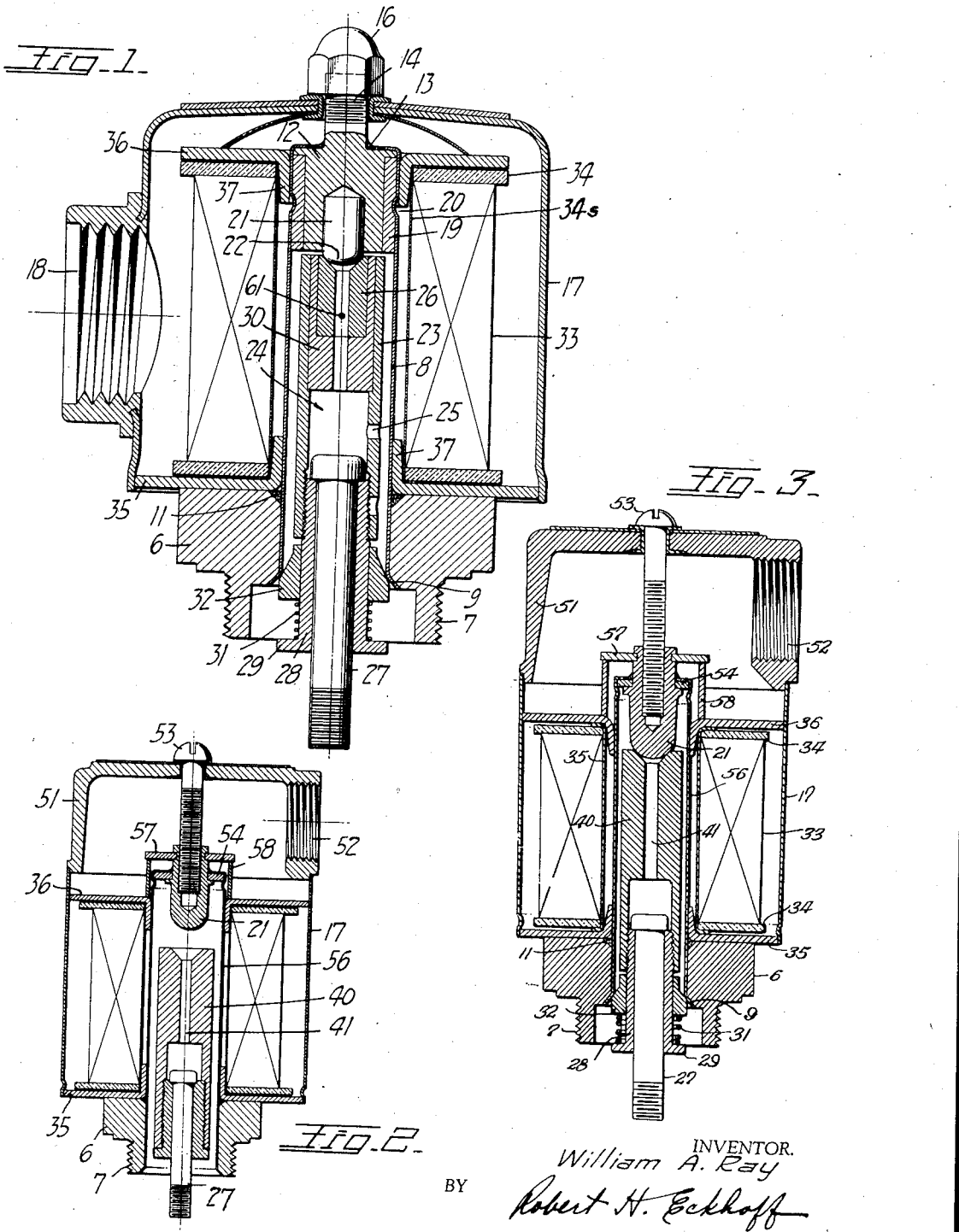
INVENTOR.
William A. Ray
BY Robert H. Eckhoff
ATTORNEY.

Patented Nov. 2, 1937

2,098,195

UNITED STATES PATENT OFFICE 2,098,195

SOLENOID

William A. Ray, San Francisco, Calif., assignor to General Controls Company, a corporation of California Application July 27, 1936, Serial No. 92,748

5 Claims. (Cl. 175—338)

This invention relates to an electro-magnetic operator, commonly termed a solenoid. The present invention relates to an improved construction of a device generally disclosed in my copending application Serial No. 635,386, filed October 3, 1932. This actuator is useful in conjunction with valves of a small size, particularly those used in domestic heating installations. Since the actuator operates quietly upon alternating current, it is adapted particularly to the operation of valves in domestic heating operations for, upon current failure, the valve automatically closes, thus insuring that fuel will not be supplied to a burner if the electric control circuit, in which the valve is included, should fail.

While the solenoid disclosed in the aforesaid application was successful, it was limited in power. The actuator of the present invention has been devised to provide a small actuator capable of supplying more power than that heretofore supplied by actuators of comparable size and input power requirements.

It is in general the broad object of the present invention to improve upon the construction of solenoid actuators to the end that the effective force upon the solenoid plunger is materially increased, although the electro-motive force utilized is substantially the same.

It is another object of the present invention to improve upon solenoid actuators to secure a higher efficiency in operation upon alternating current accompanied by an absence of any humming or vibration.

The invention includes other objects and features of advantage, some of which, together with the foregoing, will be set forth at length hereinafter in the disclosure of the present preferred construction.

In the drawing accompanying and forming a part hereof:

Figure 1 is a section taken through a solenoid structure involving the present preferred construction in which means are provided at opposite ends of the plunger for locating it.

Figure 2 is a cross section through another form of solenoid.

Figure 3 is a cross section through the form of solenoid shown in Figure 2 with means for locating both ends of the plunger.

The actuator of the present invention is provided with a base 6 having a threaded extension 7 so that the actuator can be suitably attached to a housing, such as that including a valve or other device to be operated. A non-magnetic tube 8 of brass, monel, or the like, is rolled over as at 9 against the base 6 at one end thereof to provide a circular seating surface for reasons which will presently appear. The tube 8 is extended through the base 6 and secured thereto as by soldering 11. An insert 12 is secured as at 13 to the tube, the insert including an extension 14 threaded to receive a nut 16. A suitable housing, generally indicated at 17, is mounted upon and is secured in place upon the threaded extension 14 by means of the nut, this housing including an inlet 18 for attachment of a conduit including lead-in wires.

The extension 12 is made of non-magnetic material, but carries a ring 19 of magnetic material. This ring is grooved as at 20 and the tube 8 is rolled in to fit this groove and to retain the magnetic ring in place. A magnetic insert 21 is carried on the extension 12, the insert 21 projecting beyond the extension 12 and being formed at 22 to center the solenoid plunger generally indicated by numeral 24. The solenoid plunger is a composite structure, including an outer magnetic shell 23 or primary core approximating in size the ring 19. Mounted within and adjacent the upper end is a non-magnetic plug 30 providing a shading ring. Inserted within this plug is a magnetic plug 26 providing a secondary core. The magnetic plug 26 and non-magnetic plug 30 are concentrically apertured longitudinally to release fluid. In addition, the shell 23 is apertured as at 25.

Slidably mounted in the bottom portion of the solenoid plunger (Figures 1 and 3) is a stud 27. This stud is retained in place by a sleeve 28 of magnetic material screwed into the bottom of the sleeve 23. Sleeve 28 has a shoulder 29 thereon against which rests a light spring 31. This spring urges a collar 32 upwardly to engage the annular surface 9 provided by the base 6 and the flared portion of the tube 8, as previously mentioned.

The electromotive force is supplied by a coil 33 formed upon a spool fashioned of opposite insulating annular members 34 usually of insulating material. The members 34 are joined by a spun over metal sleeve 34s. The coil is positioned between magnetic washers 35 and 36, these washers being mounted upon and including angular portions 37 extending along the tube 8.

In operation, the current flow through the coil reaches a maximum flow at the peak of the sine wave, and a minimum or zero flow at the end of each half cycle. Actually there is a large flow of current provided in one direction for a fraction of a second, followed by cessation of current flow when the half cycle changes or the current reverses. The present invention enables an effective force to be maintained upon the solenoid plunger at all times and even though the current for an instant is zero and subsequently reverses. This substantially constant force upon the plunger enables the humming noise to be overcome.

The present invention is concerned with the accurate centering of the plunger at all times, by means of the spring pressed collar 32 as well as the extension of insert 21 at 22 engaging the insert 26. At the same time two separate paths for magnetic flow are provided, one through the washers 35 and 36 and their extensions 37, through the magnetic ring 19 and the magnetic sleeve 23. The other course includes the washers, their extension 37, the magnetic insert 21 and insert 26.

It is to be noted that the parts comprising the upper portion of the solenoid are substantially the same size as those provided upon the movable portion so that the effect of the air gap between the two is materially reduced. At the same time the solenoid plunger element and the magnetizing elements of the coil are so arranged as to reduce the effect of any air gap.

The present construction has enabled the effective force of the solenoid to be materially increased. For example, utilizing the same size coil, including the same size wire and number of turns arranged in the same manner, the present construction enables an effective force of forty ounces to be exerted by the solenoid, while the same coil, when utilized in the construction shown in the aforementioned copending application, was only effective to exercise a force of 10 ounces. The material increase is obvious.

It is to be noted that the main core provided by the sleeve is larger than the secondary core provided by insert 26. This is important to avoid sticking when the current is cut off, stop 21 also being of small mass and isolated so that it cannot provide enough residual magnetism to hold the plunger in its raised position. This isolation is secured by the non-magnetic support. While the stop is isolated when the current is off, the ring 19 and extensions 37 ensure an adequate path for the flux.

The housing 17 is of magnetic material and is mounted directly on the bottom washer 35 so that magnetic flux is conducted between the two washers and about the coil. Washer 36 is close to the housing and while an air gap exists between the two, the housing is of large area to provide ample magnetic conduction.

Sticking is one of the most objectionable features in a device of this character and its avoidance is one of the primary objects hereof. This is attained by providing a primary path through the plunger having a much larger capacity for conduction of the flux than that of a secondary path, elements in the primary path being out of contact with each other when the plunger is raised. The elements providing the secondary path are of small mass relatively to those in the primary path.

The present invention provides means for centering the plunger when it is raised, this means comprising the spring urged collar 32, which centers on the surface 9, and the stop 21 and core 26. These cooperate to maintain the plunger in the magnetic center of the coil, the plunger, stop, collar and surface 9 being symmetrical with respect to the longitudinal axis of the plunger.

In Figure 2 I have shown a modified structure in which the solenoid plunger at 40 is made of a single piece, the upper portion being suitably apertured as at 41 to provide for fluid release from the interior of the solenoid.

This type of structure is subject to sticking and, generally, will stick more often than the structure heretofore described in connection with Figure 1. However, the tendency to stick is reduced by having the plunger relatively long.

In the structure shown in Figure 2 it is to be noted that I have indicated the housing 17 as engaging both the washers 35 and 36, thus providing a definite magnetic path between these washers. The housing 51, usually of non-magnetic material, is mounted upon the top of the housing 17 and includes a connection 52 for wiring. A screw 53 secures the housing 51 in place. This screw engages the magnetic stop 21. Mounted upon the magnetic stop and secured thereto is a non-magnetic washer 54 which is secured to a non-magnetic tube 56. A washer 57 is secured on the magnetic stop 21, this washer engaging a non-magnetic ring 58 which is supported upon washer 36.

The structure described is particularly useful upon lower cycle alternating currents, particularly the 25 and 50 cycle. The structure disclosed in connection with Figure 1 can also be rendered useful upon the lower alternating currents by inserting a small magnetic rivet 61 between the primary and secondary cores to provide a magnetic leakage path between these.

The magnetic material employed is usually stainless steel, iron or the like while the non-magnetic material is brass or copper, a conductive material which is non-magnetic.

In Figure 3 I have illustrated the centering means of Figure 1 applied to the plunger type shown in Figure 2.

I claim:

1. In a device of the character described, a solenoid plunger having a longitudinal axis, a coil concentric about said axis for moving said plunger including a passage therein for receiving said plunger, means for supporting said coil, stop means engageable by said plunger at one end of said passage and cooperating with said plunger to center one end of said plunger on said axis, a cone shaped collar carried by said plunger and slidable along said plunger to engage said support means to center the other end of said plunger, and a spring urging said collar along said plunger.

2. In a device of the character described, a coil; magnetic members positioned at each end of the coil; a plunger; said coil and said members having a passage therethrough for said plunger with each of said members flanged inwardly along said passage to provide annular magnetic members at each end of said passage; a stop member including an outer magnetic stop member positioned within one of said annular members and extending into said passage, a non-magnetic stop member coextensive substantially with the inside of said outer magnetic member, and an inner magnetic stop member enclosed by said non-magnetic member at its side portion and end away from said plunger, said outer member, said non-magnetic member and said inner member being joined together as a substantially unitary structure fixed in position at one end of said passage; said plunger comprising a non-magnetic plunger member carrying a magnetic plunger insert therein for engaging said inner magnetic stop member, said plunger non-magnetic member enclosing said magnetic plunger insert substantially entirely at its side portion and end away from said stop member, and an outer magnetic plunger sleeve substantially surrounding said non-magnetic member and extending, when said stop member is engaged by said plunger insert, from closely adjacent said outer stop member to the annular member at the other end of said passage.

3. In a device of the character described, a coil; magnetic members positioned at each end of the coil; a plunger; said coil and said members having a passage therethrough for said plunger; a stop member including an outer magnetic stop member positioned at one end of said passage; a non-magnetic stop member coextensive substantially with the inside of said outer magnetic member, and an inner magnetic stop member enclosed by said non-magnetic member at its side portion and end away from said plunger, said outer member, said non-magnetic member and said inner member being joined together as a substantially unitary structure fixed in position at one end of said passage with said inner member extending beyond the other members of said stop; said plunger comprising a non-magnetic plunger member carrying a magnetic plunger insert therein for engaging said inner magnetic stop member within the confines of one of said non-magnetic members, said plunger non-magnetic member enclosing said magnetic plunger insert substantially entirely at its side portion and end away from said stop member, and an outer magnetic plunger sleeve substantially surrounding said non-magnetic member and extending, when said stop member is engaged by said plunger insert, from closely adjacent said outer stop member to the annular member at the other end of said passage.

4. In a device of the character described, a coil; magnetic members positioned at each end of the coil; a plunger; said coil and said members having a passage therethrough for said plunger with each of said members flanged inwardly along said passage to provide annular magnetic members at each end of said passage; a stop member including an outer magnetic stop member positioned within one of said annular members and extending into said passage, a non-magnetic stop member coextensive substantially with the inside of said outer magnetic member, and an inner magnetic stop member enclosed by said non-magnetic member at its side portion and end away from said plunger, said outer member, said non-magnetic member and said inner member being joined together as a substantially unitary structure fixed in position at one end of said passage; said plunger comprising a non-magnetic plunger member carrying a magnetic plunger insert therein for engaging said inner magnetic stop member, said plunger non-magnetic member enclosing said magnetic plunger insert substantially entirely at its side portion and end away from said stop member, and an outer magnetic plunger sleeve substantially surrounding said non-magnetic member and extending, when said stop member is engaged by said plunger insert, from closely adjacent said outer stop member to the annular member at the other end of said passage; a magnetic housing for said coil in engagement with the magnetic member at the end of the coil away from said stop; and means securing said housing on said stop non-magnetic member.

5. In a device of the character described, a coil; magnetic members positioned at each end of the coil; a plunger; said coil and said members having a passage therethrough for said plunger; a stop member including an outer magnetic stop member positioned at one end of said passage; a non-magnetic stop member coextensive substantially with the inside of said outer magnetic member, and an inner magnetic stop member enclosed by said non-magnetic member at its side portion and end away from said plunger, said outer member, said non-magnetic member and said inner member being joined together as a substantially unitary structure fixed in position at one end of said passage with said inner member extending beyond the other members of said stop; said plunger comprising a non-magnetic plunger member carrying a magnetic plunger insert therein for engaging said inner magnetic stop member within the confines of one of said non-magnetic members, said plunger non-magnetic member enclosing said magnetic plunger insert substantially entirely at its side portion and end away from said stop member, and an outer magnetic plunger sleeve substantially surrounding said non-magnetic member and extending, when said stop member is engaged by said plunger insert, from closely adjacent said outer stop member to the annular member at the other end of said passage; a magnetic housing for said coil in engagement with the magnetic member at the end of the coil away from said stop; and means securing said housing on said stop non-magnetic member.

WILLIAM A. RAY.